No. 629,082. Patented July 18, 1899.
W. I. LAW.
MEANS FOR WASHING DISHES.
(Application filed Mar. 23, 1899.)
(No Model.)
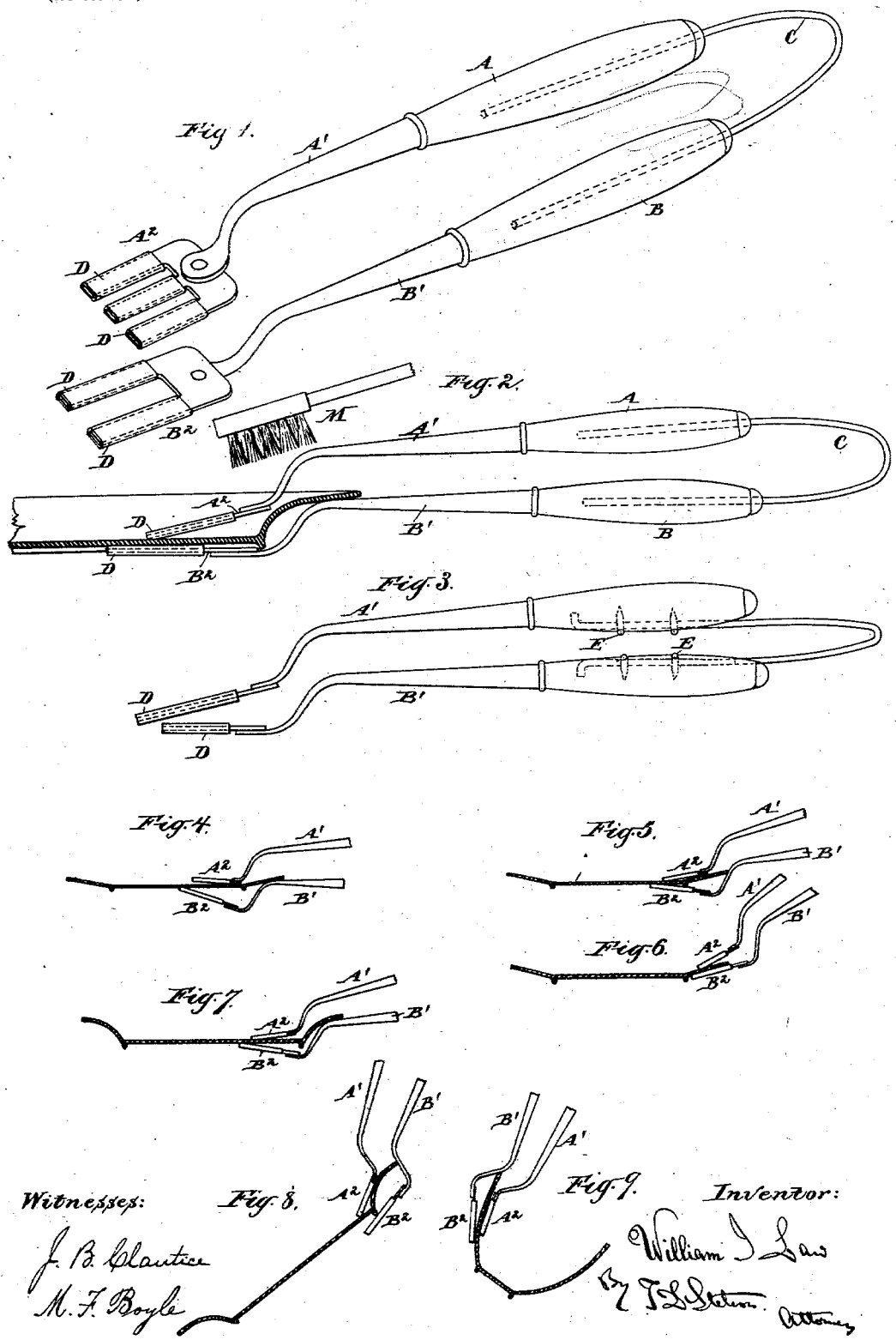

UNITED STATES PATENT OFFICE.

WILLIAM I. LAW, OF NEW YORK, N. Y.

MEANS FOR WASHING DISHES.

SPECIFICATION forming part of Letters Patent No. 629,082, dated July 18, 1899.

Application filed March 23, 1899. Serial No. 710,159. (No model.)

*To all whom it may concern:*

Be it known that I, WILLIAM I. LAW, a citizen of the United States, residing in the borough of Manhattan, in the city and State of New York, have invented a certain new and useful Improvement in Means for Washing Dishes, of which the following is a specification.

I take up the dishes one by one with specially-formed spring-tongs adapted to properly hold dishes of all ordinary kinds and allow the grip to be easily shifted and to be varied in force as required for different sizes and forms. The washing is easily and rapidly effected by a handled swab or brush with the water as hot as may be desired.

The accompanying drawings form a part of this specification and represent what I consider the best means of carrying out the invention.

Figure 1 is a perspective view of the tongs open and empty. Fig. 2 is a side view of the same tongs closed to hold a dish, the latter shown in section. Fig. 3 is a corresponding side view on the same scale as Fig. 2, showing a modification in the tongs. Figs. 4 to 9 are outlines on a smaller scale, showing portions of the first-described form holding different dishes in several positions.

Similar letters of reference indicate corresponding parts in all the figures where they appear.

Referring to Figs. 1 and 2, A and B are handles of wood, and C is a spring of hard-brass wire.

A' and B' are bent extensions attached, respectively, to the wood arms A and B. These are fitted so that the bends in both are in the same direction and perform an important function, as will presently appear.

$A^2$ and $B^2$ are blades riveted to the metal parts A' B'. The blades are forked, the lowermost, $B^2$, cut so as to leave two tines and the uppermost, $A^2$, being wider and cut to leave three tines. Soft vulcanized-rubber coverings D, in the form of flattened tubes, are thrust on from the point of each tine of the forks.

The parts A' and B' are so bent that both the blades $A^2$ and $B^2$ are presented considerably below the line of the handles. The bend insures that when the tongs are applied to grasp a plate, platter, or other nearly flat dish and are thrust inward sufficiently thereon the under side of the dish bridges across, bearing at the front ends of the blade $B^2$ and a considerable distance back on the bent handle B'. This is important in connection with another feature—the shorter length of the upper arm. The upper blade $A^2$ descends in such position that its front edge is presented between the two bearing-points in the lower arm. If the article seized is nearly or quite plane, the tongs come to a bearing sooner. If, on the contrary, the article seized is very "dishing," the tongs will close farther. This allows the device to take a firm hold of the great variety of plates, saucers, &c., including deep bowls, which require to be treated. One blade is narrower than the other. In seizing small cups the tongs should be so presented that the narrow blade will go inside. It is for some reasons preferable to have the lower blade the narrower, as shown in Fig. 1. In such case it is easy to turn the hand and present the narrow blade $B^2$ uppermost in seizing a cup.

Suppose a tier of dinner-plates to be lying in an ordinary dish-pan. The water covering them may be boiling. The operator holding the tongs in the left hand, thrusts them with the lower blade under the uppermost dish, and on closing, holds the uppermost plate firmly between the soft-coated blades. The washing is rapidly done with a handled brush worked by the other hand, or it may be a dish-mop or other swab. The hold of the tongs is dexterously shifted once or twice during the operation, so that all the surface is accessible to the treatment. The dish can be rapidly passed through a second water for a rinse and set on edge. The heat will usually dry the dishes without wiping.

Modifications may be made without departing from the principle or sacrificing the advantages of the invention. I attach importance to the facility for easily removing and replacing the coverings D, applying from the front edge and removing by returning them again toward the front on the several tines. I attach importance to soft rubber as the material for the covering, not only on account of its high elasticity, allowing it to be distended in applying and to be gripped tightly after it is in place, but also its highly-frictional quality aiding it to hold the dishes firmly with a moderate grasping force; but other soft material, as felt or knitted fabrics possessing those qualities in a less degree, may serve. I have shown the lowermost blade extending beyond the uppermost, but the reverse condition may obtain, if preferred. Fig. 3 shows the latter condition. I may employ other modes of securing the spring C to the handles A B. Figs. 1 and 2 show the spring fastened by inserting its ends longitudinally into the wood. Another good way is shown in Fig. 3, where the wire extends along a groove in each handle with the ends bent at right angles and thrust into corresponding holes in the wood. In such case the fastening is secured by one or more staples E, partially embracing the wire and driven firmly into the wood.

I claim as my invention—

1. Tongs for washing dishes, comprising arms A B of wood or analogous non-conducting material, extensions A', B', both bent in the same direction, a spring C connecting them at one end, and blades or widened portions $A^2$, $B^2$, at the free ends, adapted to serve substantially as herein specified.

2. Tongs for washing dishes comprising arms A, B, of wood or analogous non-conducting material having extensions A' B', both bent in the same direction, a spring C, connecting them at one end, blades or widened portions $A^2$, $B^2$, at the free ends of the extensions and of different widths forked, and removable soft coverings D, on the tines of said forks, combined and arranged to serve substantially as herein specified.

In testimony that I claim the invention above set forth I affix my signature in presence of two witnesses.

WILLIAM I. LAW.

Witnesses:
J. B. CLAUTICE,
M. F. BOYLE.